(12) United States Patent
Wang et al.

(10) Patent No.: US 12,457,367 B2
(45) Date of Patent: Oct. 28, 2025

(54) USING SUBSTITUTE MOTION INFORMATION WHEN CODING VIDEO DATA

(71) Applicant: QUALCOMM Incorporated, San Diego, CA (US)

(72) Inventors: Hongtao Wang, San Diego, CA (US); Han Huang, San Diego, CA (US); Vadim Seregin, San Diego, CA (US); Nan Hu, San Diego, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/748,939

(22) Filed: Jun. 20, 2024

(65) Prior Publication Data
US 2024/0430484 A1    Dec. 26, 2024

Related U.S. Application Data

(60) Provisional application No. 63/509,741, filed on Jun. 22, 2023.

(51) Int. Cl.
| | |
|---|---|
| *H04N 7/12* | (2006.01) |
| *H04N 19/117* | (2014.01) |
| *H04N 19/137* | (2014.01) |
| *H04N 19/159* | (2014.01) |
| *H04N 19/176* | (2014.01) |
| *H04N 19/70* | (2014.01) |
| *H04N 19/86* | (2014.01) |

(52) U.S. Cl.
CPC ......... *H04N 19/70* (2014.11); *H04N 19/117* (2014.11); *H04N 19/137* (2014.11); *H04N 19/159* (2014.11); *H04N 19/176* (2014.11); *H04N 19/86* (2014.11)

(58) Field of Classification Search
CPC .................................................. H04N 19/117
See application file for complete search history.

(56) References Cited

FOREIGN PATENT DOCUMENTS

WO    2023055199 A1    4/2023

OTHER PUBLICATIONS

International Search Report and Written Opinion—PCT/US2024/034954—ISA/EPO—Oct. 8, 2024 12 Pages.
(Continued)

*Primary Examiner* — Y Lee
(74) *Attorney, Agent, or Firm* — Shumaker & Sieffert, P.A.

(57) ABSTRACT

An example device for decoding video data includes a memory configured to store video data; and a processing system including one or more processors implemented in circuitry, the processing system being configured to: determine that a previously coded block of video data was coded using uni-prediction mode for which a bi-prediction syntax element is not assigned a value; determine that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decode the current block using a substitute value for the bi-prediction syntax element.

20 Claims, 10 Drawing Sheets

(56) References Cited

OTHER PUBLICATIONS

Robert A (Interdigital)., et al., "EE2-Related: Inter Coding Modes Modifications", Joint Video Experts Team (JVET) of ITU-T SG 16 WP 3 and ISO/IEC JTC 1/SC 29, 22nd Meeting, By Teleconference, No. JVET-V0089-v3, m56498, Apr. 20, 2021-Apr. 28, 2021, Apr. 26, 2021, 4 Pages, XP030294180, The Whole Document.
Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Torino, IT, N17055, Aug. 19, 2017, XP030150980, XP030023716, 50 Pages.
Coban M., et al., "Algorithm Description of Enhanced Compression Model 9 (ECM 9)", JVET-AD2025, Joint Video Experts Team (JVET) of ITU-T SG 16 WP 3 and ISO/IEC JTC 1/SC 29 30th Meeting, Antalya, TR, Apr. 21-28, 2023, pp. 1-76.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

FIG. 5 ically, the bowIdx value is not coded for uni-predicted
USING SUBSTITUTE MOTION INFORMATION WHEN CODING VIDEO DATA This application claims the benefit of U.S. Provisional Application No. 63/509,741, filed Jun. 22, 2023, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for substituting values for unavailable values that are unavailable due to a coding mode of a previous block that would otherwise be referred to when coding a current block. The substituted values may be pre-defined, default values, or may be retrieved or derived from a neighboring block to the current block or the previously coded block. For example, certain syntax elements may only be used for bi-directional prediction. As an example, for bi-prediction with coding unit (CU)-level weights (BCW), an index value (e.g., bcwIdx) may be coded to indicate the weight values to be used. However, the bowIdx value is not coded for uni-predicted blocks. Motion information for a current block may be predicted from neighboring blocks to the current block. Thus, if a current block is predicted using, e.g., BCW, and a neighboring block to the current block is coded using uni-prediction, a bcwIdx syntax element for the neighboring block would not be assigned a value. Per the techniques of this disclosure, a default or substitute value may be used for such syntax elements, e.g., to determine motion information for the current block.

In one example, a method of decoding video data includes determining that a previously coded block of video data was coded using uni-prediction mode for which a bi-prediction syntax element is not assigned a value; determining that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decoding the current block using a substitute value for the bi-prediction syntax element.

In another example, a device for decoding video data includes a memory configured to store video data; and a processing system including one or more processors implemented in circuitry, the processing system being configured to: determine that a previously coded block of video data was coded using uni-prediction mode for which a bi-prediction syntax element is not assigned a value; determine that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decode the current block using a substitute value for the bi-prediction syntax element.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table illustrating how split mode indexes are mapped to angle offsets.

DETAILED DESCRIPTION

Video coding generally includes partitioning a picture into blocks and individually coding each block. Coding a block may include predicting the block to form a prediction block, and coding a residual block representing differences between the prediction block and the original, uncoded block. Prediction may be performed using neighboring data to a current block in the same picture (intra-prediction) or using data of a previously coded picture (inter-prediction), which may be identified using motion information. The motion information may itself be coded as well, e.g., using merge mode or advanced motion vector prediction (AMVP) mode. Typically, when coding motion information of a current block, the motion information may be predicted from motion information for spatial and/or temporal neighboring blocks to the current block.

Motion information may be stored using a motion buffer, which may represent motion information using a fixed sized grid of entries (e.g., 4×4 sample entries). Each entry of the grid may store motion information for a corresponding block of video data. In this manner, motion information for neighboring blocks to a current block can be retrieved from entries of the motion buffer corresponding to the neighboring blocks.

In some cases, a block may be further partitioned into sub-blocks, and each of the sub-blocks may be individually predicted. For example, motion information may be coded for the entire block, then refined for each of the sub-blocks. Overlapped block motion compensation (OBMC), as explained in greater detail below, may be performed when sub-blocks of a block are individually predicted.

Inter-prediction of blocks may be performed in a single direction (uni-directional prediction) or in two directions (bi-directional prediction). Certain motion information syntax elements may only apply to one direction or another. For example, bi-prediction with CU-level weights (BCW) applies only to bi-directional prediction. Thus, a BCW index (bcwIdx) value, which may indicate weight values to be applied in BCW, may not have a value assigned in a motion buffer for blocks that are uni-directional predicted. As such, if motion information for a current block (which is BCW predicted) is being predicted from motion information of a neighboring block that is uni-directional predicted, certain syntax elements may not have values assigned. Per techniques of this disclosure, substitute values may be used for such syntax elements. In this manner, prediction of the motion information may be harmonized among various scenarios of motion information prediction, which may reduce complexity of video coders. In this manner, the performance of the video coders may be improved.

Figure 1:
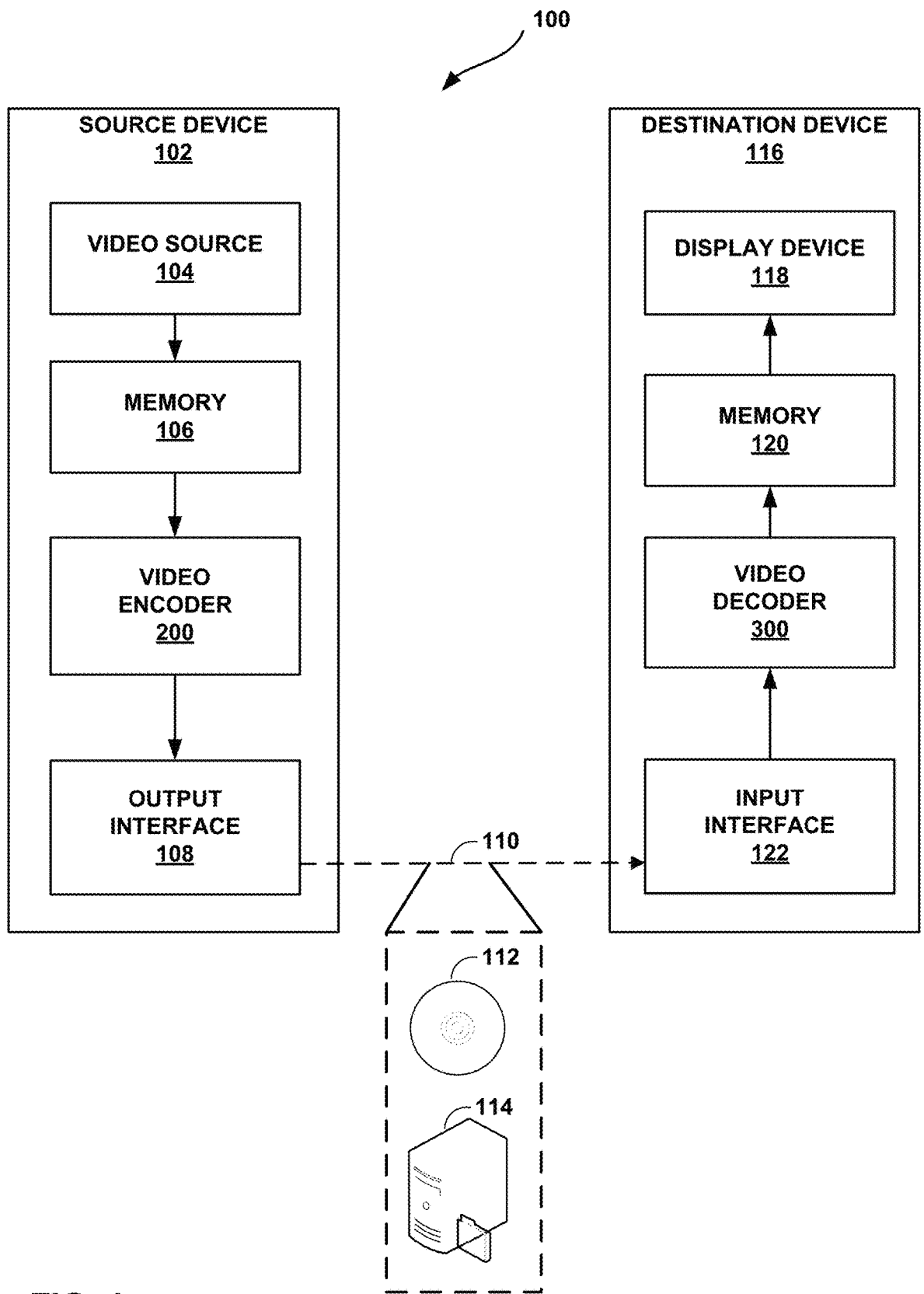
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for using substitute values when coding video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for using substitute values when coding video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use substitute values when coding video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Video encoder 200 may predict a current block using a sub-block mode, such as bi-prediction with CU-level weights (BCW). In a case where a previously coded neighboring block was coded using a mode for which a corresponding syntax element of motion information does not have a value assigned (such as a bowIdx syntax element), video encoder 200 may determine a substitute value for the bowIdx syntax element. For example, video encoder 200 may determine the substitute value as being equal to a BCW_DEFAULT value, which may be equal to BCW_NUM>>1, where ">>" represents the bitwise right shift operator, and BCW_NUM represents a number of weight options. Video decoder 300 may perform similar operations when decoding the block.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2B:
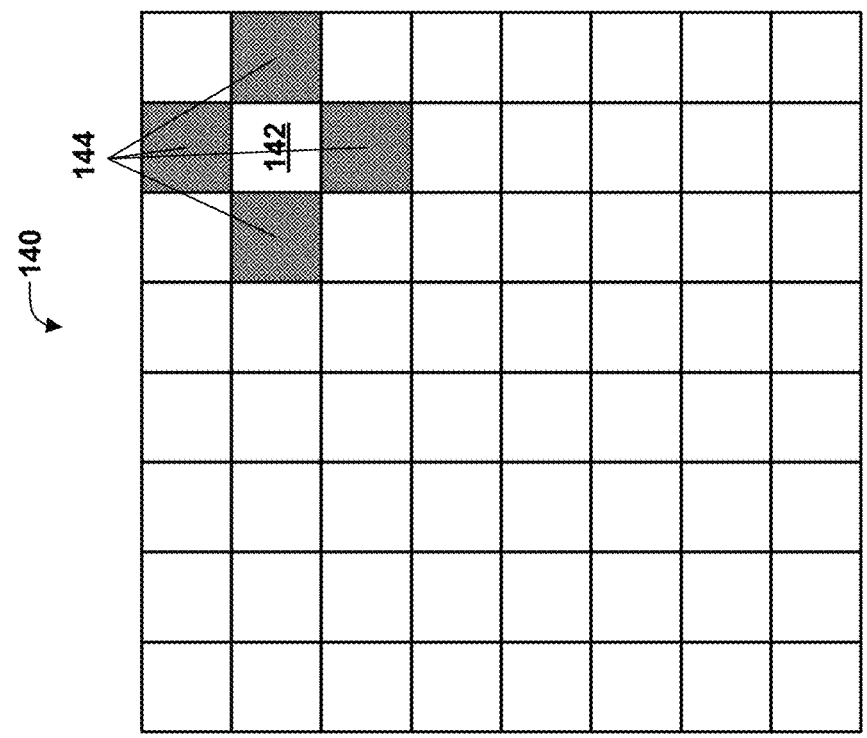
FIGS. 2A and 2B are conceptual diagrams illustrating examples of sub-blocks used in overlapped block motion compensation (OBMC).
Figure 2A:
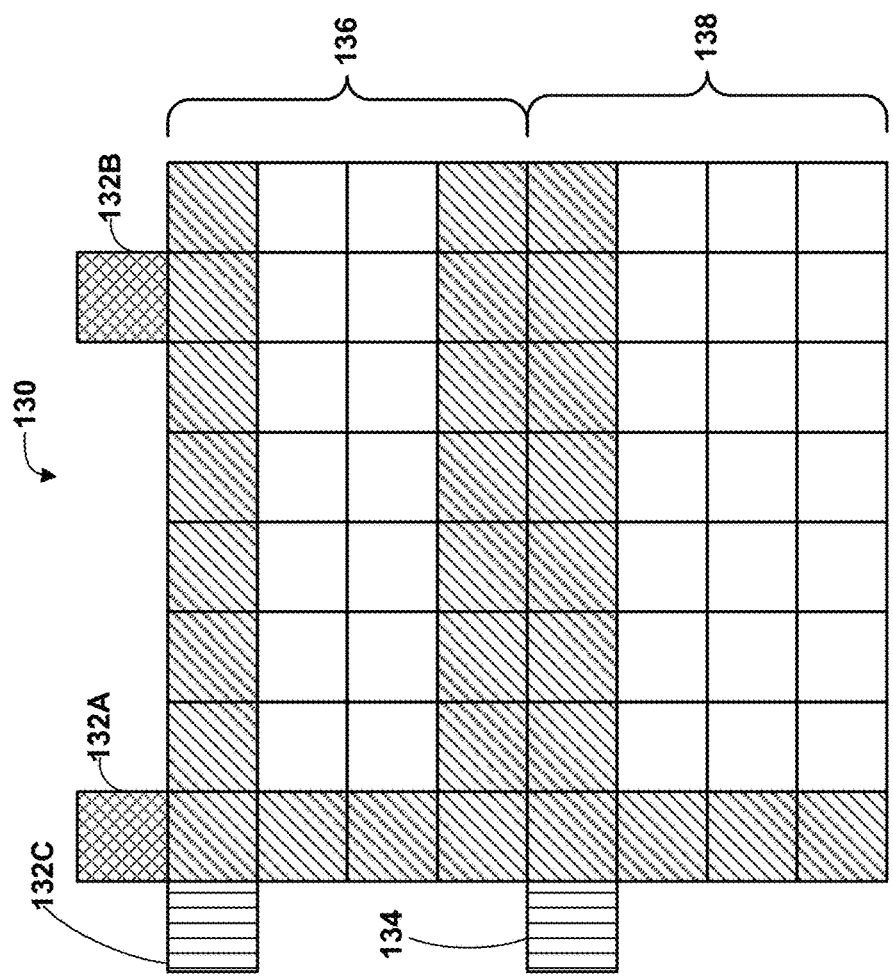

FIGS. 2A and 2B are conceptual diagrams illustrating examples of sub-blocks used in overlapped block motion compensation (OBMC). In particular, FIG. 2A depicts block 130 (which may be a coding unit (CU)) including prediction unit 136 and prediction unit 138. Diagonally shaded subblocks of prediction units 136, 138 correspond to sub-blocks for which OBMC may apply. Motion information of neighboring sub-blocks 132A, 132B, and 132C may be used to perform OBMC for prediction unit 136, while motion information of neighboring sub-block 134 may be used to perform OBMC for prediction unit 138. FIG. 2B depicts block 140 (which may be a CU). Block 140 includes sub-block 142. Motion information of neighboring blocks 144 may be used to perform OBMC of sub-block 142.

The technique of "Overlapped Block Motion Compensation" (OBMC) has been used in various video coding standards, including ITU-T H.263. In the Joint Exploration Motion (JEM) that is described in JVET-G1001, unlike in H.263, OBMC can be switched on and off using syntax at the coding unit (CU) level. When OBMC is used in JEM, OBMC is performed for all motion compensation (MC) block boundaries except the right and bottom boundaries of a CU. Moreover, OBMC is applied for both the luma and chroma components. In JEM, a MC block corresponds to a coding block. When a CU is coded with sub-CU mode (includes sub-CU merge, affine and Frame Rate Up Conversion (FRUC) mode), each sub-block of the CU is a MC block. To process CU boundaries in a uniform fashion, OBMC is performed at sub-block level for all MC block boundaries, where sub-block size is set equal to 4×4, as illustrated in FIG. 2B.

When OBMC applies to a current sub-block, besides current motion vectors, motion vectors of four connected neighbouring sub-blocks, if available and not identical to the current motion vector, are also used to derive a prediction block for the current sub-block. These multiple prediction blocks based on multiple motion vectors are combined to generate the final prediction signal of the current sub-block. For example, motion vectors for neighboring blocks 144 may be used to derive a prediction block for sub-block 142 in FIG. 2B.

A prediction block based on motion vectors of a neighbouring sub-block may be denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, OBMC is not performed from $P_N$. Otherwise, every sample of $P_N$ is added to the same sample in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighbouring sub-block, samples in the same row (column) of $P_N$ are added to $P_C$ with a same weighting factor.

BCW (Bi-prediction with CU-level weights) is a mode that allows each CU to select a set of weights when performing blending for bi-prediction. In ECM-9.0, an index (bcwIdx) is used to represent the weights selected for the current CU and a default value for BCW mode (BCW_DEFAULT=2) corresponding to the case of equal weight blending.

Figure 3:
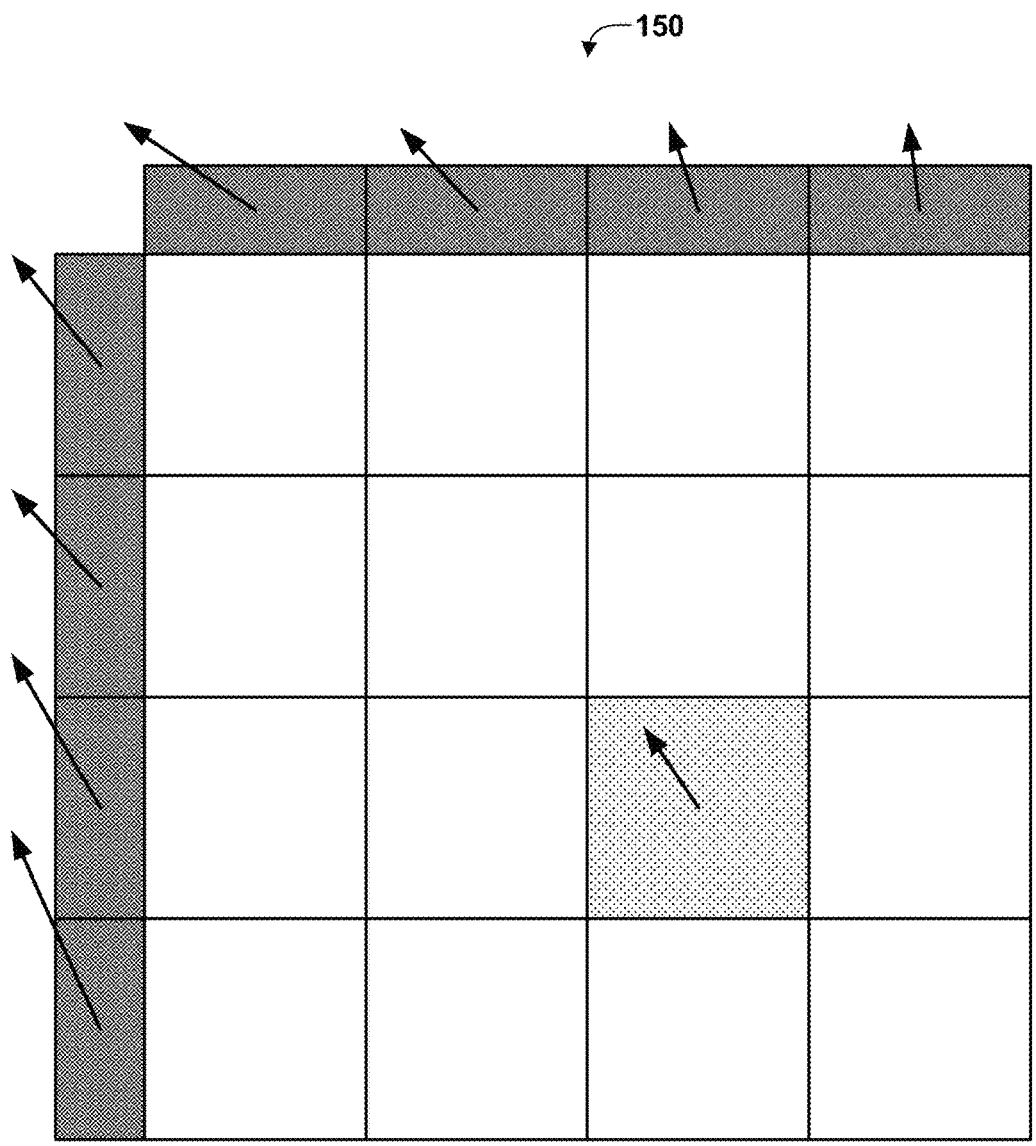
FIG. 3 is a conceptual diagram illustrating subblock template generation of subblock-based temporal motion vector prediction (SbTMVP) mode.

FIG. 3 is a conceptual diagram illustrating subblock template generation of subblock-based temporal motion vector prediction (SbTMVP) mode of a current block 150.

In VVC, Temporal Motion Vector Prediction (TMVP) for advanced motion vector prediction (AMVP) and merge mode is derived by fetching the motion information from the center or the bottom-right of the collocated block in a signaled collocated picture. Similarly, for the Subblock-based Temporal Motion Vector Prediction (SbTMVP) mode, the motion information from the left neighboring position is used as a motion shift, which is then employed to obtain TMVPs at the sub-CU level.

In ECM, to further improve the coding efficiency of TMVP, two aspects are modified. Firstly, two collocated pictures are utilized which are the two reference frames with the least POC distance relative to the to-be-coded frame. Secondly, the motion shift to locate TMVP is adaptively determined from multiple locations according to template costs. More specifically, two motion shift candidate lists are constructed respectively for the two collocated frames. The motion shifts with the minimum template matching cost are used to derive SbTMVP or TMVP candidates. At most 4 SbTMVP candidates are included in the sub-block-based merge list. The SbTMVP candidate with the least template matching cost derived from the first collocated frame is placed in the first entry without reordering, while other SbTMVP candidates are sorted together with affine candidates. In addition, the prediction direction of each subblock template is determined based on the center subblock. As illustrated in FIG. 3, if the center subblock is uni-predicted, then all the subblock templates are uni-predicted, and vice versa. If the motion vector of corresponding adjacent sub-block at the determined reference list is not available for a subblock template, zero MV is used for that subblock template.

Figure 4:
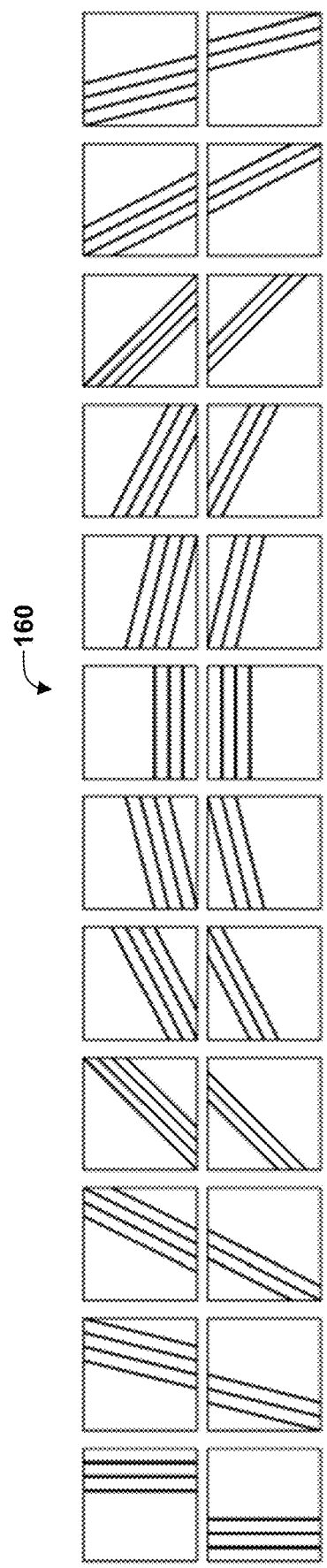
FIG. 4 is a conceptual diagram illustrating geometric partitions used for geometric partition mode (GPM).

FIG. 4 is a conceptual diagram illustrating geometric partitions 160 used for geometric partition mode (GPM). In VVC, a geometric partitioning mode is supported for inter prediction. When this mode is used, a CU is split into two parts by a geometrically located straight line shown in FIG. 4. The location of the splitting line is mathematically derived from the angle and offset parameters of a specific partition. In VVC, there are 64 splitting modes. They are organized in order by angles (from smaller one to larger on) firstly and offsets (from smaller one to larger one) secondly, and each setting of angle-offset is assigned with an index (i.e., 0 to 63) that is binarized using fixed-length code with each bin bypass-coded. The fixed-length code is a full-tree structure with 6 bins at each tree leave node.

Figure 5:
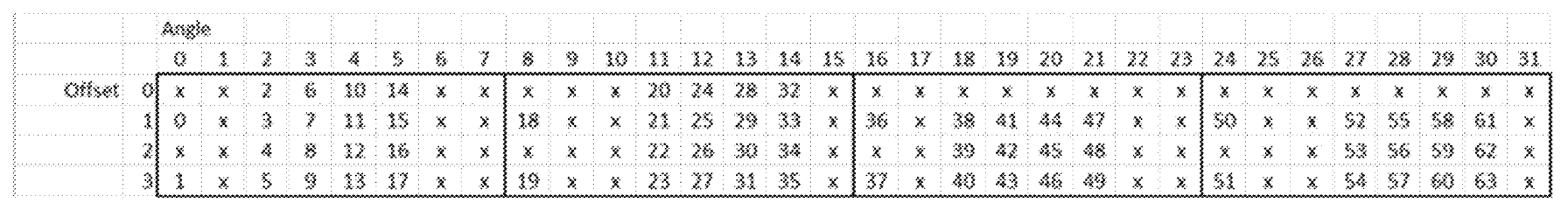

FIG. 5 is a table illustrating how split mode indexes are mapped to angle offsets. The table of FIG. 5 shows how a split mode index is mapped to angle-offset, where the N-th angle mode (i.e., N=0, . . . , 7 or 16, . . . , 23) is physically with an edge that is perpendicular to that of (N+8)-th angle mode. Each part of a geometric partition in the CU is inter-predicted using its own motion; only uni-prediction is allowed for each partition, that is, each part has one motion vector and one reference index.

The uni-prediction candidate list for GPM mode is derived directly from the regular merge candidate list. Denote n as the index of the uni-prediction motion in the geometric uni-prediction candidate list. The LX motion vector of the n-th merge candidate, with X equal to the parity (even or odd) of n, is used as the n-th uni-prediction motion vector for geometric partitioning mode. These motion vectors are marked with "x" in figure. In case a corresponding LX motion vector of the n-the extended merge candidate does not exist, the L(1−X) motion vector of the same candidate is used instead as the uni-prediction motion vector for geometric partitioning mode.

Local illumination compensation (LIC) is an inter prediction technique to model local illumination variation between a current block and its prediction block as a function of a current block template and a reference block template. The parameters of the function can be denoted by a scale α and an offset β, which forms a linear equation, that is, α*p[x]+β to compensate illumination changes, where p[x] is a reference sample pointed to by MV at a location x on reference picture. When wrap around motion compensation is enabled, the MV maybe clipped with wrap around offset taken into consideration. Since α and β can be derived based on current block template and reference block template, no signaling overhead is required for them, except that an LIC flag is signaled for AMVP mode to indicate the use of LIC.

The local illumination compensation proposed in JVET-O0066 is used for uni-prediction inter CUs with the following modifications:

Intra neighbor samples can be used in LIC parameter derivation;

LIC is disabled for blocks with less than 32 luma samples;

For both non-subblock and affine modes, LIC parameter derivation is performed based on the template block samples corresponding to the current CU, instead of partial template block samples corresponding to first top-left 16×16 unit;

Samples of the reference block template are generated by using MC with the block MV without rounding it to integer-pel precision.

In ECM-9.0, the value of some syntax elements is unspecified when that syntax is not used in the decoding process. For example, the value of bowIdx of a CU is not specified if the current CU is coded with uni-prediction (where BCW is not used). However, when another CU2, coded after the current CU, needs information of the current CU for parsing/decoding, having an unspecified value may introduce extra complexity for CU2 to be handled properly.

In ECM-9.0, the inter direction indicating whether uni (L0 or L1) or bi-prediction is applied, let's denote this direction parameter as interDir, of a PU may be modified by the template matching process. For example, a bi-predicted PU may be modified to be uni-prediction. However, the bi-prediction index indicating the weights of how uni-predictors are weighted (using a parameter denoted bewIdx) of the corresponding PU is unchanged. This inconsistency may cause an improper decision for another block in the encoding/decoding process.

In ECM-9.0, motion compensation of OBMC is performed on a sub-block basis, and motion similarity between the current sub block and the neighbor positions are used in the OMBC process. When comparing a MV of the current sub-block and the neighbor positions, sub-block level information is used. When comparing the bcwIdx with neighbors, PU level interDir and CU level bewIdx are compared. However, using PU/CU level information may encounter problems because the information may not always be the same for sub-block level and PU/CU level. As an example, in the context of Subblock based Temporal Motion Vector Prediction (SbTMVP) and Geometry Partition Mode (GPM), each subblock may have a different interDir and/or bowIdx. In this case, using the PU/CU level interDir and/or bewIdx might be inaccurate.

In the OBMC design of ECM-9.0, motion similarity based OBMC control is performed only on boundary sub-blocks. When sub-block based motion compensation is used, the motion similarity (as well as other information related to intra/inter prediction, e.g. LIC) is not considered. Ignoring such information could be sub-optimal. This disclosure describes various techniques that may overcome various issues related to OBMC as discussed above.

In some examples, video encoder 200 and video decoder 300 of FIG. 1 may be configured to use a default value for selected syntax element(s) related to a current block when the syntax element is not used for the current block but might be referred to by another block. As an example, for a coding unit/prediction unit/sub block that uses uni-prediction (interDir!=3), a default value for bewIdx may be assigned, even though bcwIdx may not be used by the current block, as it may be coded in uni-prediction mode. The default value may be any predefined value. When this example is applied to ECM-9.0, the default value BCW_DEFAULT which may be derived as (BCW_NUM>>1)=2 may be assigned. In this example, BCW_NUM is the number of weight options and BCW_DEFAULT corresponds to equal weight blending.

In some examples, video encoder 200 and video decoder 300 may be configured such that, for each item in the motion buffer (motion information, also referred to as 'MI'), if an MI uses uni-prediction (interDir!=3), a default value for bowIdx may be assigned, even though bcwIdx may not be used by the current block as it may be coded by uni-prediction mode. A default value may be any predefined value. When this example is applied to ECM-9.0, the default value BCW_DEFAULT which may be derived as (BCW_NUM>>1)=2 is assigned, where BCW_NUM is the number of weight options and BCW_DEFAULT corresponds to equal weight blending.

The difference of assigning the value for a coding/prediction unit and motion information buffer, is that in the first case the value is assigned to the whole block, while in the second case the value is assigned at the level of the motion information granularity, which for example may be a sub-block of 4×4. This means that each sub-block may have a differently assigned value.

As yet another example, in the case of SbTMVP, a default value (for example BCW_DEFAULT value) may be assigned to the motion information at sub-block level and/or CU/PU level.

In some examples, video encoder 200 and video decoder 300 may be configured to use the information of the sub-block associated with the neighboring position (instead of using PU/CU level information) when certain types of information from a neighbor position is needed. For example, in the case of OBMC, when checking the similarity between the current block/sub-block and a neighbor position, the interDir information of the current block/sub-block and sub-block associated with the neighboring position may be used.

As another example, in the case of OBMC, when checking the similarity between the MI of the current block/sub-block and a neighbor position, instead of using a motion parameter (for example bewIdx) of the current CU/PU and the neighbor CU/PU associated with the neighbor position, the motion parameter (for example bcwIdx information) of the current block/sub-block and the sub-block that associated with the neighboring position is used.

Other examples of the scenario that uses sub-block level motion information instead of PU/CU level motion information include a boundary strength calculation for de-blocking filter or other de-blocking filter parameters (e.g., filter width, filter strength, etc.)

Other examples include the usage of any motion information from neighbor positions. When a motion vector, block vector, reference picture(s), LIC information (LIC flag, LIC scaling factor, LIC offset), or other motion information associated with neighbor position(s) is needed for the current block/sub-block, the corresponding information may instead be obtained from the sub-block(s) associated the neighbor position(s), instead of the PU/CU associated with the neighbor position(s).

In general, the similarity check may be performed by checking some motion parameters (not necessarily all available), in some way defined as important parameters.

Figure 6:
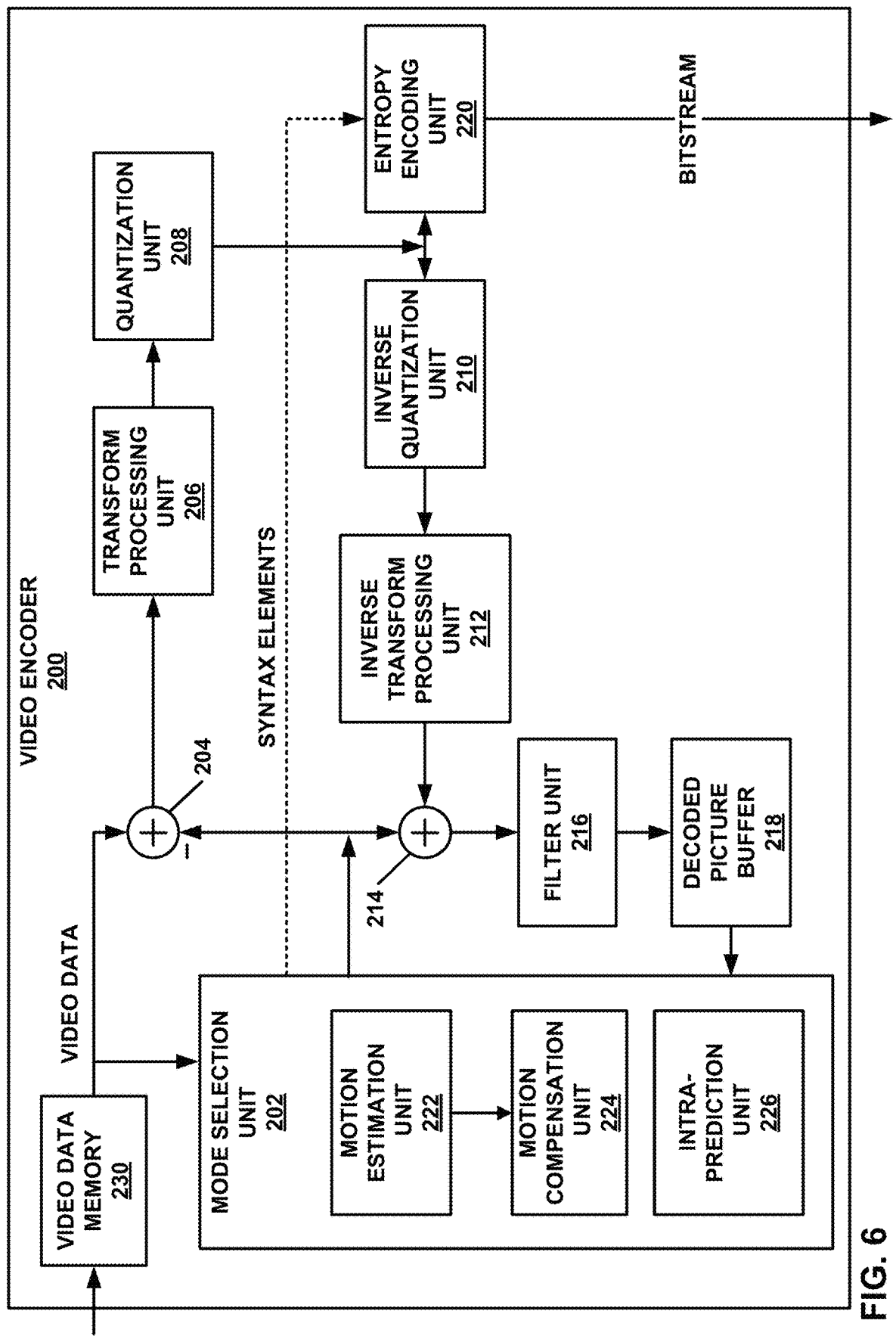
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUS, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion compensation unit 224 may predict a current block using a sub-block mode, such as bi-prediction with CU-level weights (BCW). In a case where a previously coded neighboring block was coded using a mode for which a corresponding syntax element of motion information does not have a value assigned (such as a bcwIdx syntax element), motion compensation unit 224 may determine a substitute value for the bcwIdx syntax element. For example, motion compensation unit 224 may determine the substitute value as being equal to a BCW_DEFAULT value, which may be equal to BCW_NUM>>1, where ">>" represents the bitwise right shift operator, and BCW_NUM represents a number of weight options.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
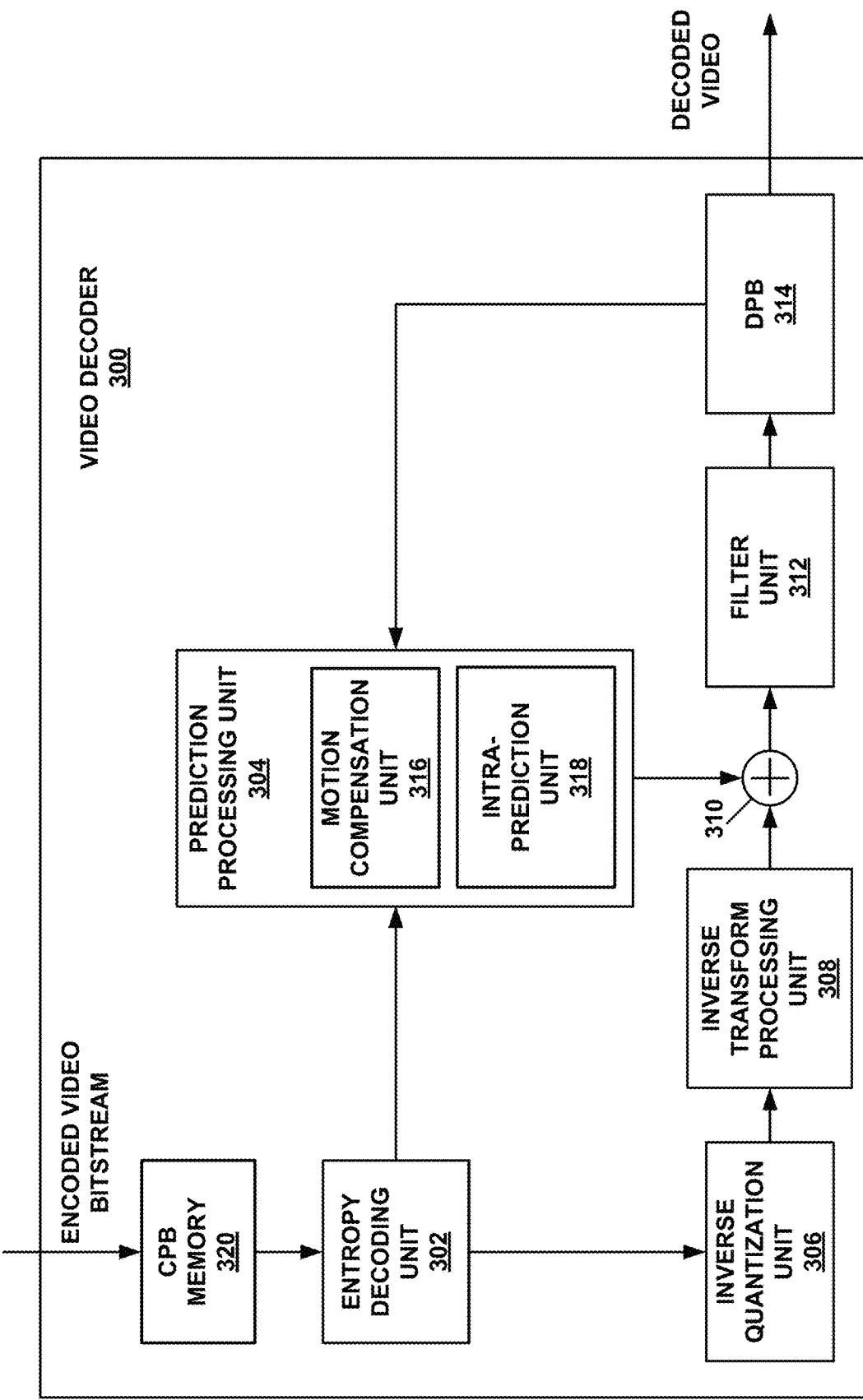
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Motion compensation unit 316 may predict a current block using a sub-block mode, such as bi-prediction with CU-level weights (BCW). In a case where a previously coded neighboring block was coded using a mode for which a corresponding syntax element of motion information does not have a value assigned (such as a bcwIdx syntax element), motion compensation unit 316 may determine a substitute value for the bcwIdx syntax element. For example, motion compensation unit 316 may determine the substitute value as being equal to a BCW_DEFAULT value, which may be equal to BCW_NUM>>1, where ">>" represents the bitwise right shift operator, and BCW_NUM represents a number of weight options.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 8:
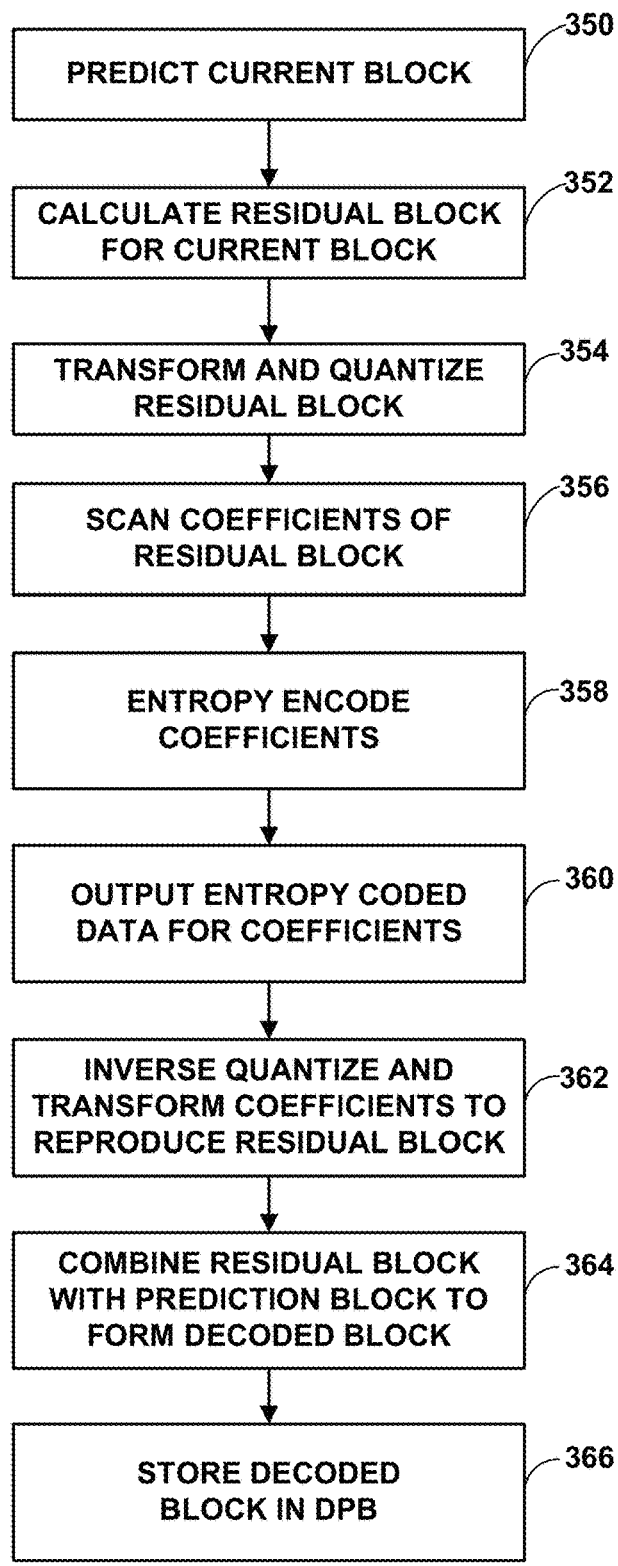
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may use any of the various techniques of this disclosure, alone or in any combination, when predicting the current block. For example, video encoder 200 may substitute a value for an unavailable syntax element of a previously coded block with a substitute value, such as a pre-defined, default value or a value taken from a neighboring block, when coding the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 9:
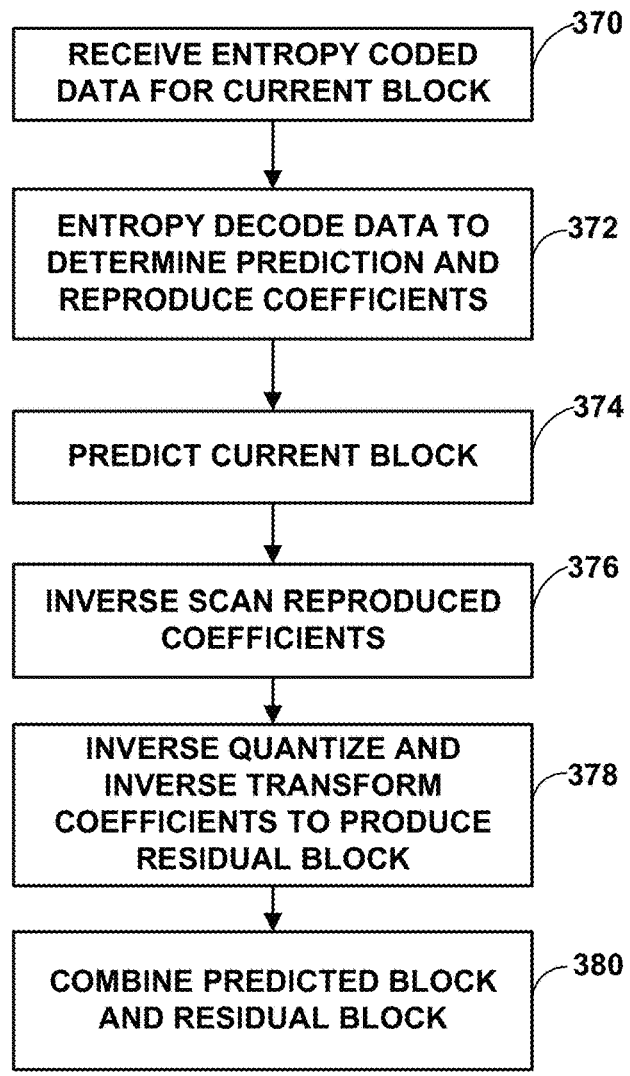
FIG. 9 is a flowchart illustrating an example method for decoding a current block in accordance with the techniques of this disclosure.

FIG. 9 is a flowchart illustrating an example method for decoding a current block of video data in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may use any of the various techniques of this disclosure, alone or in any combination, when predicting the current block. For example, video decoder 300 may substitute a value for an unavailable syntax element of a previously coded block with a substitute value, such as a predefined, default value or a value taken from a neighboring block, when coding the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 10:
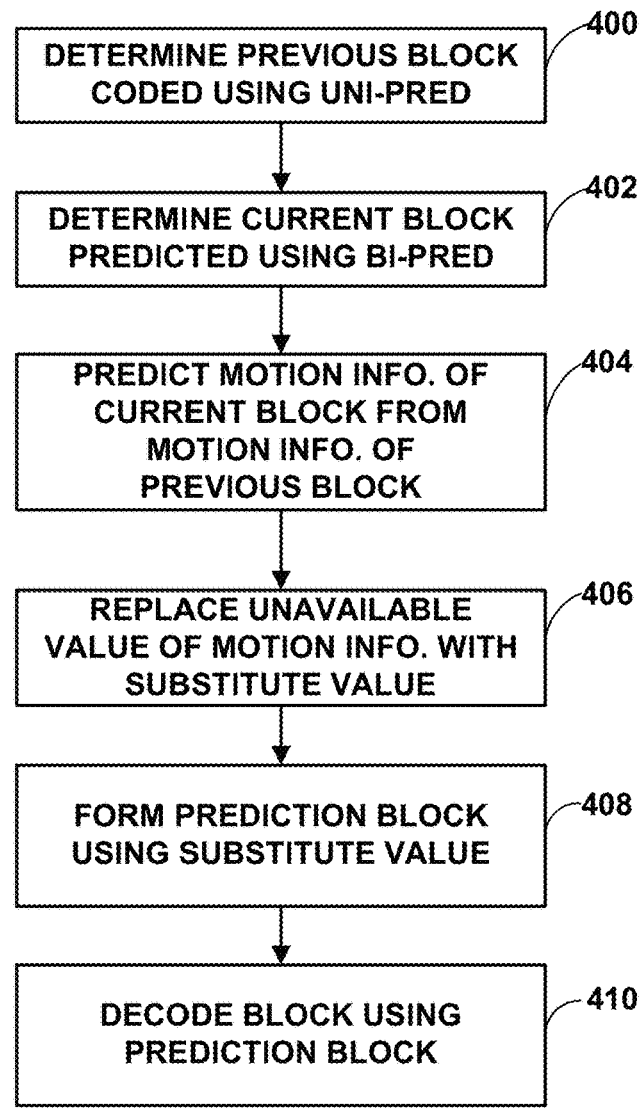
FIG. 10 is a flowchart illustrating an example method of coding a block of video data according to techniques of this disclosure.

FIG. 10 is a flowchart illustrating an example method of coding a block of video data according to techniques of this disclosure. The method of FIG. 10 may be performed by, e.g., video encoder 200 or video decoder 300. For purposes of example, the method of FIG. 10 is explained with respect to video decoder 300.

Initially, video decoder 300 may determine that a previously coded block of video data was coded using uni-prediction (400). Because the previously coded block of video data was coded using uni-prediction, one or more syntax elements related to bi-directional prediction may not have values assigned, e.g., bcwIdx, in a motion buffer entry corresponding to the previously coded block.

Video decoder 300 may then determine that a current block is predicted using a bi-prediction mode (402), such as BCW. Additionally, video decoder 300 may determine that motion information of the current block is to be predicted from the motion information of the previously coded block (404), for example, a bcwIdx of the previously coded block. However, as noted above, in this example, the previously coded block is uni-predicted, such that the bowIdx syntax element does not have an assigned value. In response, per the techniques of this disclosure, video decoder 300 may replace the unavailable value of the motion information with a substitute value (406). Thus, video decoder 300 may form a prediction block for the current block using the substitute value (408). Video decoder 300 may then decode the current block using the prediction block (410).

In this manner, the method of FIG. 10 represents an example of a method of decoding video data, including: determining that a previously coded block of video data was coded using uni-prediction mode for which a bi-prediction syntax element is not assigned a value; determining that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decoding the current block using a substitute value for the bi-prediction syntax element.

Various examples of the techniques of this disclosure are summarized in the following clauses:

Clause 1: A method of decoding video data, the method comprising: determining that a previously coded block of video data was coded using a first coding mode for which a reference syntax element is not assigned a value; determining that a current block of the video data is to be coded using a second coding mode that refers to the reference syntax element; and coding the current block using a substitute value for the reference syntax element.

Clause 2: The method of clause 1, wherein the substitute value comprises a predefined value.

Clause 3: The method of clause 2, wherein the first coding mode comprises uni-directional inter-prediction, and wherein the reference syntax element comprises a bi-prediction with coding unit (CU)-level weights index (bcwIdx) syntax element.

Clause 4: The method of clause 3, wherein the predefined value comprises a default value BCW_DEFAULT, derived as (BCW_NUM>>1)=2, wherein BCW_NUM is a number of weight options and BCW_default corresponds to equal weight blending.

Clause 5: The method of clause 1, wherein the substitute value comprises a value of a corresponding syntax element for a neighboring block to the current block.

Clause 6: The method of clause 5, wherein the corresponding syntax element comprises an inter prediction direction (interDir) syntax element.

Clause 7: The method of clause 5, wherein the corresponding syntax element comprises a bi-prediction with coding unit (CU)-level weights index (bcwIdx) syntax element.

Clause 8: The method of clause 5, wherein the corresponding syntax element comprises a boundary strength syntax element.

Clause 9: The method of any of clauses 1-8, further comprising encoding the current block prior to decoding the current block.

Clause 10: A method comprising any of the techniques of this disclosure, alone or in any combination.

Clause 11: A device for decoding video data, the device comprising one or more means for performing the method of any of clauses 1-10.

Clause 12: The device of clause 11, wherein the one or more means comprise a processing system including one or more processors implemented in circuitry.

Clause 13: The device of any of clauses 11-12, further comprising a display configured to display the decoded video data.

Clause 14: The device of any of clauses 11-13, wherein the device comprises one or more of a camera, a computer, a mobile device, a broadcast receiver device, or a set-top box.

Clause 15: The device of clause 11-14, further comprising a memory configured to store the video data.

Clause 16: A computer-readable storage medium having stored thereon instructions that, when executed, cause a processor of a device for decoding video data to perform the method of any of clauses 1-10.

Clause 17: A device for decoding video data, the device comprising: means for determining that a previously coded block of video data was coded using a first coding mode for which a reference syntax element is not assigned a value; means for determining that a current block of the video data is to be coded using a second coding mode that refers to the reference syntax element; and means for coding the current block using a substitute value for the reference syntax element.

Clause 18: A method of decoding video data, the method comprising: determining that a previously coded block of video data was coded using uni-prediction mode for which a bi-prediction syntax element is not assigned a value; determining that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decoding the current block using a substitute value for the bi-prediction syntax element.

Clause 19: The method of clause 18, wherein the bi-prediction syntax element comprises a bi-prediction with coding unit (CU)-level weights index (bcwIdx) syntax element, wherein the substitute value comprises a default value (BCW_DEFAULT), the method further comprising deriving BCW_DEFAULT=(BCW_NUM>>1), wherein BCW_NUM is a number of weight options.

Clause 20: The method of clause 19, wherein BCW_NUM is equal to 1.

Clause 21: The method of clause 19, wherein BCW_DEFAULT corresponds to equal weight blending for the BCW mode.

Clause 22: The method of clause 18, wherein the current block comprises a 4×4 sub-block of a prediction unit (PU).

Clause 23: The method of clause 22, wherein the 4×4 sub-block comprises a first 4×4 sub-block of the PU, the method further comprising determining a different value for a bi-prediction syntax element of a second, different 4×4 sub-block of the PU than the substitute value.

Clause 24: The method of clause 18, further comprising determining the substitute value from a value of a corresponding bi-prediction syntax element for a neighboring block to the current block.

Clause 25: The method of clause 24, wherein the corresponding bi-prediction syntax element comprises an inter prediction direction (interDir) syntax element.

Clause 26: The method of clause 24, wherein the corresponding bi-prediction syntax element comprises a syntax element used to determine a boundary strength for a deblocking filter.

Clause 27: The method of clause 18, further comprising encoding the current block prior to decoding the current block.

Clause 28: A device for decoding video data, the device comprising: a memory configured to store video data; and a processing system including one or more processors implemented in circuitry, the processing system being configured to: determine that a previously coded block of video data was coded using uni-prediction mode for which a bi-prediction syntax element is not assigned a value; determine that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decode the current block using a substitute value for the bi-prediction syntax element.

Clause 29: The device of clause 28, wherein the bi-prediction syntax element comprises a bi-prediction with coding unit (CU)-level weights index (bcwIdx) syntax element, wherein the substitute value comprises a default value (BCW_DEFAULT), and wherein the processing system is further configured to derive BCW_DEFAULT=(BCW_NUM>>1), wherein BCW_NUM is a number of weight options.

Clause 30: The device of clause 28, wherein the current block comprises a 4×4 sub-block of a prediction unit (PU).

Clause 31: The device of clause 30, wherein the 4×4 sub-block comprises a first 4×4 sub-block of the PU, and wherein the processing system is further configured to determine a different value for a bi-prediction syntax element of a second, different 4×4 sub-block of the PU than the substitute value.

Clause 32: The device of clause 28, wherein the processing system is further configured to determine the substitute value from a value of a corresponding bi-prediction syntax element for a neighboring block to the current block.

Clause 33: The device of clause 32, wherein the corresponding bi-prediction syntax element comprises an inter prediction direction (interDir) syntax element.

Clause 34: The device of clause 32, wherein the corresponding bi-prediction syntax element comprises a syntax element used to determine a boundary strength for a deblocking filter.

Clause 35: The device of clause 28, wherein the processing system is further configured to encode the current block prior to decoding the current block.

Clause 36: The device of clause 28, further comprising a display configured to display the decoded video data.

Clause 37: The device of clause 28, wherein the device comprises one or more of a camera, a computer, a mobile device, a broadcast receiver device, or a set-top box.

Clause 38: A method of decoding video data, the method comprising: determining that a previously coded block of video data was coded using uni-prediction mode for which a bi-prediction syntax element is not assigned a value; determining that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decoding the current block using a substitute value for the bi-prediction syntax element.

Clause 39: The method of clause 38, wherein the bi-prediction syntax element comprises a bi-prediction with coding unit (CU)-level weights index (bcwIdx) syntax element, wherein the substitute value comprises a default value (BCW_DEFAULT), the method further comprising deriving BCW_DEFAULT=(BCW_NUM>>1), wherein BCW_NUM is a number of weight options.

Clause 40: The method of clause 39, wherein BCW_NUM is equal to 1.

Clause 41: The method of any of clauses 38 and 39, wherein BCW_DEFAULT corresponds to equal weight blending for the BCW mode.

Clause 42: The method of any of clauses 38-41, wherein the current block comprises a 4×4 sub-block of a prediction unit (PU).

Clause 43: The method of clause 42, wherein the 4×4 sub-block comprises a first 4×4 sub-block of the PU, the method further comprising determining a different value for a bi-prediction syntax element of a second, different 4×4 sub-block of the PU than the substitute value.

Clause 44: The method of clause 38, further comprising determining the substitute value from a value of a corresponding bi-prediction syntax element for a neighboring block to the current block.

Clause 45: The method of clause 24, wherein the corresponding bi-prediction syntax element comprises an inter prediction direction (interDir) syntax element.

Clause 46: The method of clause 24, wherein the corresponding bi-prediction syntax element comprises a syntax element used to determine a boundary strength for a deblocking filter.

Clause 47: The method of any of clauses 38-46, further comprising encoding the current block prior to decoding the current block.

Clause 48: A device for decoding video data, the device comprising: a memory configured to store video data; and a processing system including one or more processors implemented in circuitry, the processing system being configured to: determine that a previously coded block of video data was coded using uni-prediction mode for which a bi-prediction syntax element is not assigned a value; determine that a current block of the video data is to be coded using a bi-prediction mode and that motion information of the current block is to be predicted from the previously coded block, including from the bi-prediction syntax element of the previously coded block; and in response to the bi-prediction syntax element of the previously coded block not having an assigned value, decode the current block using a substitute value for the bi-prediction syntax element.

Clause 49: The device of clause 48, wherein the bi-prediction syntax element comprises a bi-prediction with coding unit (CU)-level weights index (bcwIdx) syntax element, wherein the substitute value comprises a default value (BCW_DEFAULT), and wherein the processing system is further configured to derive BCW_DEFAULT=(BCW_NUM>>1), wherein BCW_NUM is a number of weight options.

Clause 50: The device of any of clauses 48 and 49, wherein the current block comprises a 4×4 sub-block of a prediction unit (PU).

Clause 51: The device of clause 50, wherein the 4×4 sub-block comprises a first 4×4 sub-block of the PU, and wherein the processing system is further configured to determine a different value for a bi-prediction syntax element of a second, different 4×4 sub-block of the PU than the substitute value.

Clause 52: The device of clause 48, wherein the processing system is further configured to determine the substitute value from a value of a corresponding bi-prediction syntax element for a neighboring block to the current block.

Clause 53: The device of clause 52, wherein the corresponding bi-prediction syntax element comprises an inter prediction direction (interDir) syntax element.

Clause 54: The device of clause 52, wherein the corresponding bi-prediction syntax element comprises a syntax element used to determine a boundary strength for a deblocking filter.

Clause 55: The device of any of clauses 48-54, wherein the processing system is further configured to encode the current block prior to decoding the current block.

Clause 56: The device of any of clauses 48-55, further comprising a display configured to display the decoded video data.

Clause 57: The device of any of clauses 48-56, wherein the device comprises one or more of a camera, a computer, a mobile device, a broadcast receiver device, or a set-top box.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a previously coded block of video data was coded using uni-prediction mode for which a bi-prediction syntax element is not assigned a value, wherein the bi-prediction syntax element comprises a bi-prediction with coding unit (CU)-level weights index (bcwldx) syntax element;
    determining that a current block of the video data is to be coded using a bi-prediction mode and that motion information of the current block is to be predicted from the previously coded block, including from the bi-prediction syntax element of the previously coded block; and
    in response to the bi-prediction syntax element of the previously coded block not having an assigned value, decoding the current block using a substitute value for the bi-prediction syntax element, wherein the substitute value comprises a default value (BCW_DEFAULT), and wherein decoding the current block using the substitute value comprises deriving BCW_DEFAULT=(BCW_NUM>>1), wherein BCW_NUM is a number of weight options.

2. The method of claim 1, wherein BCW_NUM is equal to 1.

3. The method of claim 1, wherein BCW_DEFAULT corresponds to equal weight blending for a BCW mode.

4. The method of claim 1, wherein the current block comprises a 4×4 sub-block of a prediction unit (PU).

5. The method of claim 4, wherein the 4×4 sub-block comprises a first 4×4 sub-block of the PU, the method further comprising determining a different value for a bi-prediction syntax element of a second, different 4×4 sub-block of the PU than the substitute value.

6. The method of claim 1, further comprising determining the substitute value from a value of a corresponding bi-prediction syntax element for a neighboring block to the current block.

7. The method of claim 6, wherein the corresponding bi-prediction syntax element comprises an inter prediction direction (interDir) syntax element.

8. The method of claim 6, wherein the corresponding bi-prediction syntax element comprises a syntax element used to determine a boundary strength for a deblocking filter.

9. The method of claim 1, further comprising encoding the current block prior to decoding the current block.

10. A device for decoding video data, the device comprising:
    a memory configured to store video data; and
    a processing system including one or more processors implemented in circuitry, the processing system being configured to:
        determine that a previously coded block of video data was coded using uni-prediction mode for which a bi-prediction syntax element is not assigned a value, wherein the bi-prediction syntax element comprises a bi-prediction with coding unit (CU)-level weights index (bcwldx) syntax element;
        determine that a current block of the video data is to be coded using a bi-prediction mode and that motion information of the current block is to be predicted from the previously coded block, including from the bi-prediction syntax element of the previously coded block; and
        in response to the bi-prediction syntax element of the previously coded block not having an assigned value, decode the current block using a substitute value for the bi-prediction syntax element, wherein the substitute value comprises a default value (BCW_DEFAULT), and wherein decoding the current block using the substitute value comprises deriving BCW_DEFAULT=(BCW_NUM>>1), wherein BCW_NUM is a number of weight options.

11. The device of claim 10, wherein the current block comprises a 4×4 sub-block of a prediction unit (PU).

12. The device of claim 11, wherein the 4×4 sub-block comprises a first 4×4 sub-block of the PU, and wherein the processing system is further configured to determine a different value for a bi-prediction syntax element of a second, different 4×4 sub-block of the PU than the substitute value.

13. The device of claim 10, wherein the processing system is further configured to determine the substitute value from a value of a corresponding bi-prediction syntax element for a neighboring block to the current block.

14. The device of claim 13, wherein the corresponding bi-prediction syntax element comprises an inter prediction direction (interDir) syntax element.

15. The device of claim 13, wherein the corresponding bi-prediction syntax element comprises a syntax element used to determine a boundary strength for a deblocking filter.

16. The device of claim 10, wherein the processing system is further configured to encode the current block prior to decoding the current block.

17. The device of claim 10, further comprising a display configured to display the decoded video data.

18. The device of claim 10, wherein the device comprises one or more of a camera, a computer, a mobile device, a broadcast receiver device, or a set-top box.

19. The device of claim 10, wherein BCW_NUM is equal to 1.

20. The device of claim 10, wherein BCW_DEFAULT corresponds to equal weight blending for a BCW mode.

* * * * *